United States Patent [19]

Hilbrans et al.

[11] Patent Number: 4,491,470

[45] Date of Patent: Jan. 1, 1985

[54] METHOD FOR SEPARATING NON-FERROUS METALS FROM FERRUGINOUS SECONDARY SUBSTANCES

[75] Inventors: Hermann Hilbrans, Langenfeld; Chatty Rao, Bergisch Gladbach, both of Fed. Rep. of Germany

[73] Assignee: Klockner-Humboldt-Deutz AG, Fed. Rep. of Germany

[21] Appl. No.: 491,458

[22] Filed: May 4, 1983

[30] Foreign Application Priority Data

Jun. 5, 1982 [DE] Fed. Rep. of Germany ....... 3221283

[51] Int. Cl.$^3$ .............................. C22B 1/20
[52] U.S. Cl. .............................. 75/5; 75/25
[58] Field of Search .............................. 75/25, 3-9

[56] References Cited

U.S. PATENT DOCUMENTS

| | | | |
|---|---|---|---|
| 2,128,379 | 8/1938 | Spencer, Jr. | 75/5 |
| 3,313,617 | 4/1967 | Ban et al. | 75/5 |
| 3,318,685 | 5/1967 | Handwerk | 75/5 |
| 3,386,816 | 6/1968 | English | 75/3 |
| 3,482,964 | 12/1969 | Ishimitsu et al. | 75/3 |
| 3,754,890 | 8/1973 | Fitch | 75/3 |
| 4,373,946 | 2/1983 | Kilian . | |

FOREIGN PATENT DOCUMENTS

| | | | |
|---|---|---|---|
| 2497235 | 7/1982 | France | 75/25 |
| 56-238 | 1/1981 | Japan | 75/3 |
| 447553 | 5/1936 | United Kingdom | 75/5 |
| 1413346 | 11/1975 | United Kingdom | 75/5 |
| 1543432 | 4/1979 | United Kingdom | 75/25 |
| 897868 | 1/1982 | U.S.S.R. | 75/3 |

Primary Examiner—L. Dewayne Rutledge
Assistant Examiner—S. Kastler
Attorney, Agent, or Firm—Hill, Van Santen, Steadman & Simpson

[57] ABSTRACT

A method for separating non-ferrous metals from ferruginous secondary substances such as residues and slurries from blast furnaces, steel mills, rolling mills, and the like. In accordance with the invention, a layer of the secondary substances is combined in agglomerated form with at least one layer of a sinterable mixture. The non-ferrous metals are volatilized off and recovered in the form of an oxide dust. The recovered dust is separated into at least two fractions having different non-ferrous metal contents and then the dust fractions are sintered with the sinterable mixture.

14 Claims, 3 Drawing Figures

METHOD FOR SEPARATING NON-FERROUS METALS FROM FERRUGINOUS SECONDARY SUBSTANCES

BACKGROUND OF THE INVENTION

1. Field of the Invention

This invention is in the field of separating non-ferrous metals from secondary substances which are waste products in steel manufacture, the method being carried out within the framework of a sintering process wherein the secondary substances are employed as part of a fill which contains at least one mixture of a secondary substance and a regular sinterable mixture in the form of layers. The non-ferrous metals are volatilized and recovered as dust for return to the sintering operation.

2. Description of the Prior Art

A method for separating non-ferrous metals, particularly lead and zinc, from such secondary substances is disclosed in our German Patent application P No. 30 42 941, corresponding to U.S. Ser. No. 319,939, filed Nov. 10, 1981 of which this application is a continuation-in-part. As described in the prior application, a mixture containing such secondary substance and a normal sintering mixture are introduced into a sintering process in the form of layers. The layer consisting of pre-sintered material is disposed at the bottom, that is, directly adjacent to the sintering grate. This lowermost layer serves for the thermal protection of the sintering grate. Next, there is a layer which contains, among other things, the secondary substances and a further layer which consists of a normal sintering mixture. Gas extraction hoods are situated below the sintering grate so that an ignition process initiated in the uppermost layer propagates through the fill and the exhaust gases are withdrawn downwardly. The gas extraction hoods are combined with one another at the exhaust gas side such that there is one group connected to a blower and a second group connected to a different blower. The combination of gas extraction hoods on the exhaust gas side is designed in conjunction with the conveying speed of the sintering grate, the thickness of the material placed on the grate, as well as the propagation speed of the ignition front traversing the fill from top to bottom such that the ignition front reaches the layer carrying the secondary substances at the time at which the fill has arrived at the inlet area of the second group of gas extraction hoods. The possibility is thus created of achieving conditions necessary for lead and zinc separation by means of changing the temperature and pressure conditions in the gas extraction hoods of the second group, in conjunction with the use of a fuel excess in the layer carrying the secondary substances.

The non-ferrous metals predominantly consisting of oxides of lead and zinc are thereby reduced, volatilized, discharged as a gaseous phase, and are substantially reoxidized and collected as dust by means of a gas filter.

SUMMARY OF THE INVENTION

The present invention is an inprovement upon the type of method described above. In accordance with the present invention, the mixture containing the secondary substance is employed in agglomerated form in the fill. The dust developed and recovered in the layer containing the normal sintering mixture is divided into at least two fractions having different contents of non-ferrous metals which are at least partially re-introduced into the sintering process. As a result of this partial re-introduction, the possibility of enriching these non-ferrous metals consisting essentially of lead and zinc in the discharge dusts is provided while at the same time the remaining iron content of these waste dusts can be completely recovered to a substantial degree.

In a preferred form of the invention, the non-ferrous metals consisting of zinc and lead and the composition of the agglomerates is such that a zinc content of at least 0.5 wt. %, preferably 1 wt. %, and a lead content preferably not in excess of 0.5 wt. % exist. The quantitative setting of a specific zinc and lead content in the secondary substances is possible in a simple manner, that is, means of a simple, gravimetric metering of individual dust or slurry.

In a further form of the present invention, chlorides such as chlorides of calcium, magneisum, iron, or alkali metal are added to the secondary substances in such an amount that there is at least a stoichiometric proportion suitable for chlorinating zinc and lead oxides. The conversion of the non-ferrous metal oxides into corresponding chlorides during the sintering process produces the advantage of a lower volatilization temperature so that an optimum separation of non-ferrous metals can be achieved with particular temperature conditions. The chlorides can be added in liquid form to the agglomerates containing the secondary substances during the production of the agglomerates.

In a further form of the invention, the lowest layer of the fill introduced into the sintering process has a coarser grain size than the layers disposed above the lowest layer. The resistance of the fill to gas permeation is thus prevented from increasing toward the bottom. The grain size of the lowest layer is thereby upwardly limited such that the agglomerates containing the secondary substance cannot trickle down into the area of the grate or the grate bars and cause blockages which would reduce the permeability of the fill for the sintering gases.

Finally, an intermediate sintering layer is disposed between the lowest layer and the layer carrying the agglomerates which contains either no fuel or only a slight amount of fuel in comparison to the layer carrying the normal sintering mixture. The heat consumption of the intermediate sintering layer is thus provided by the additional heat released by the combustion of excess carbon in the agglomerate layer containing the secondary substance.

BRIEF DESCRIPTION OF THE DRAWINGS

A further description of the present invention will be made in conjunction with the attached sheets of drawings in which.

DESCRIPTION OF THE PREFERRED EMBODIMENTS

Figure 1:
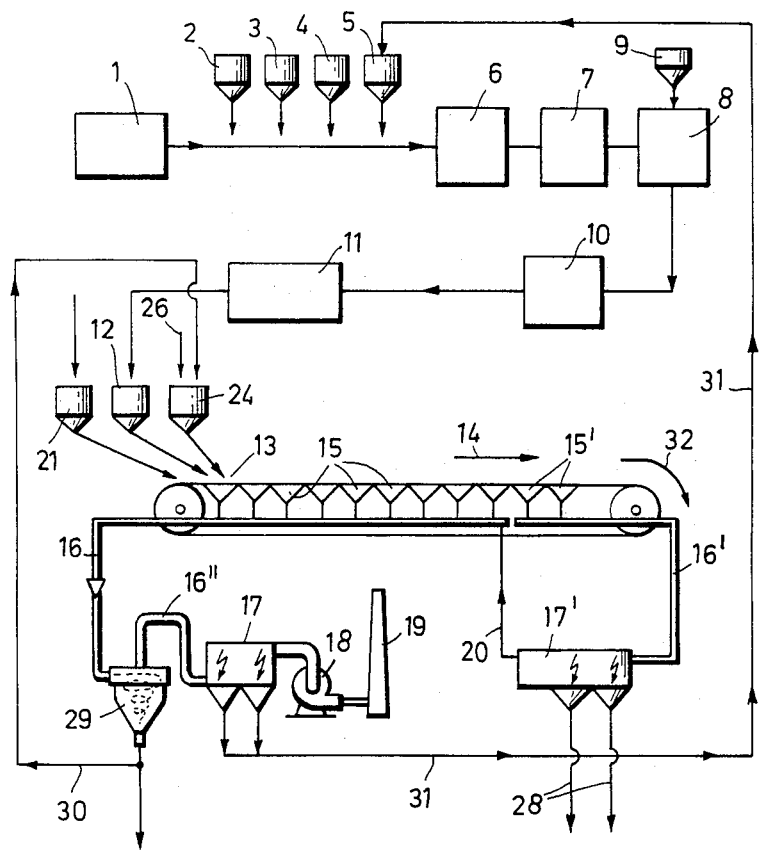
FIG. 1 is a flow chart of a sintering installation according to the present invention.

In FIG. 1, reference numeral 1 indicates generally a dump for dusts, slurries, and other residues which may be in the form of rolling mill dusts, steel mill dusts, blast furnace dusts and/or slurries or other residues of a comparable composition and consistency. The zinc or lead contents of these individual components is essentially known in any metallurgical plant. A dust or a slurry mixture whose zinc and lead content is known is produced by means of a gravimetric metering and combination (not illustrated in the drawing) of individual components. Numbers 2 through 5 indicate different hoppers for ores, fuel, calcium sources, as well as reflux dusts. These individual components are metered from the hoppers and added to the slurry or dust mixture leaving the dump 1 such that a zinc content of at least 0.5 wt. % and preferably 1 wt. % is provided in the overall mixture and that a lead content of 0.5 wt. % is not exceeded.

The overall mixture consisting of lead and zinc containing secondary substances, ores, fuel, bonding agent, and reflux dusts subsequently proceeds into a mixing device 6 where it is intensively mixed for a number of minutes and the water contained in the secondary substances in homogeneously distributed within the mixture. This homogenized mixture subsequently proceeds into a dryer 7 and from there into a mill 8. The mill 8, for example, can be a rod mill or a vibration grinding mill and is connected to a deleivery means 9 for a cold bonding agent. This cold bonding agent is preferably mixed in the form of a fast setting cement such as an aluminous rapid hardening cement and is added in an amount of about 5 to 15 wt. %, preferably 5 to 8% of the overall mixture. Using hydrated lime as the bonding agent, this should be present in an amount of about 5 through 20 wt. % and preferably 8 through 15 wt. % relative to the overall mixture.

The overall mixture consisting of ferruginous seconday substances, ores, fuels, bonding agent and reflux dusts subsequently proceeds into an agglomeration zone 10. This zone, for example, can be a granulating drum, a granulating dish or the like.

The agglomerates containing the secondary substance, have a basicity ratio $CaO/SiO_2$ which corresponds at least to that employed in the normal sintering mixture, that is, a value of at least 1.2. The agglomerates proceed from the zone 10 to an intermediate hopper 11 where a secondary storage occurs, and heat is added if necessary. Depending on the consistency of the agglomerates to be achieved, storage can last for example from 6 through 48 hours and preferably from 12 through 24 hours. The hardened agglomerates containing the secondary substance finally proceed over a further hopper 12 to a sintering grate 13 which is in the form of an induced draft sintering grate. The sintering grate moves in the direction of the arrow 14 with a variable speed and is driven by a suitable drive means (not illustrated).

A series of gas extraction hoods 15 are provided below the sintering grate 13 and are partially connected to an exhaust gas collecting line 16 which leads to an electric filter 17 and a blower 18 into an exhaust gas chimney 19. The two last extraction hoods 15' are connected to a separate exhaust gas collecting line 16' which leads to a hot gas electric filter 17'. The hot gas electric filter 17' is disposed in series with the electric filter 17 so that gases traversing the former proceed over a connecting line 20, the exhaust gas collecting line 18, the electric filter 17, and the blower 18 into the exhaust gas chimney 19.

Figure 2:
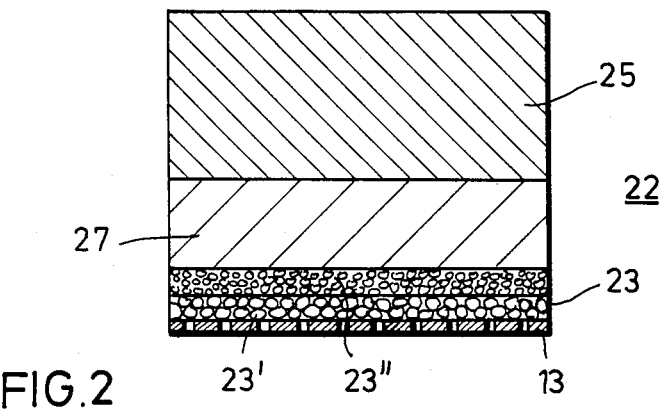
FIG. 2 is an enlarged view illustrating the cross section of the sintering fill.
Figure 3:
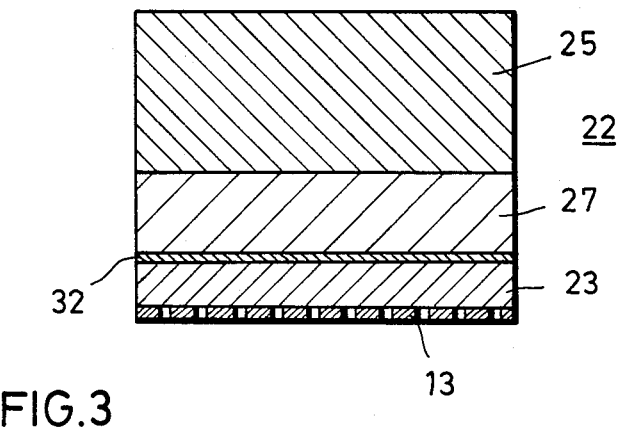
FIG. 3 is a modified form of sintering fill which could be used in accordance with the present invention.

A feeder hopper 21 is provided to store pre-sintered material and delivers such material to the sintering grate 13 to form the lowest layer 23 within a fill 22 as illustrated in FIGS. 2 and 3. The lowest layer serves for the thermal protection of the sintering grate 13. A further feeded hopper 24 contains a normal sintering mixture which is introduced and which forms the uppermost layer 25 of the fill 22. The sintering mixture is composed of conventional ores, coke, and calcium components and proceeds into the hopper 24 in pre-crumbled form over a conveying means indicated by the arrow 26.

The agglomerated secondary substances extracted from the hopper 12 form a layer 27 within the fill 22 on the sintering grate 13 whose height amounts to appoximately 2 through 10% of the height of the fill 22.

In the operation of the sintering installation, the fill 22 situated on the sintering grate 13 is ignited so that an ignition front progressively migrates through the fill from top to bottom. The conveying speed of the sintering grate 9 in the direction of the arrow 14 is determined by the height of the fill and the propagation speed of the ignition front. It is adjusted such that the ignition front reaches the layer 27 only when the last two gas extraction hoods 15' have been reached. Reducing conditions exist in the two gas extraction hoods 15' and the conditions necessary for the removal of lead and zinc are met. The lead or zinc oxide contained in the layer 27 is thereby reduced, volatilized, withdrawn over the gas extraction line 16', and re-oxidized and withdrawn as dust in the hot gas electric filter 17' as shown by the arrows 28. The dust may contain sufficient amounts of metals so that it would be suitable for direct use in zinc or lead smelting plants. In contrast, if the dust arising in the exhaust gas line 16 contains relatively low amounts of zinc or lead, it proceeds into a hot gas cyclone separator 29 disposed in the exhaust gas line 16 in which the dusts introduced therein are divided into a fine grained, high zinc or high lead fraction and a coarse grained, low lead or low zinc fraction. The latter is at least partially supplied to the feeder hopper 24 for the normal sintering mixture over the line 30 and the high zinc or high lead fraction proceeds over the connecting line 16" between the hot gas cyclone separator 29 and the electric filter 17 into the latter. The dust is separated from the gas stream and is subsequently returned over a line 31 to the hopper 5 as reflux dust and is then mixed with the secondary substances to be agglomerated. Any other desired mechanical separating means can be employed instead of the hot gas cyclone separator 29. The sintered material is discharged as shown by the arrow 32.

As required, the high zinc or high lead dust proceeding as indicated by the arrows 28 can be re-introduced into the sintering process and added to the mixture containing the secondary substance so that a more intensive enrichment with lead or zinc occurs in the discharged dusts.

The disposition of the individual layers forming the fill 22 can be seen from FIGS. 2 and 3. The lowest layer 23 can, for example, be subdivided into two layers having different grain sizes whereby a layer 23' directly adjacent to the sintering grate 13 may have a grain size, for example, of 15 through 25 mm, and the layer 23" lying thereabove may have a grain size of 3 to 15 mm.

It is also possible to select the grain size in the entire range of the lowest layer 23 to be coarser, at approximately 15 through 25 mm than the grain size of the layer 27 which usually has a grain size between 3 through 15 mm. By doing so, a trickling of agglomerates containing the secondary substance through the layer 23 to the sintering grate 13 is essentially prevented.

The lowest layer 23' may exhibit a height of approximately 2 to 3 cm and the layer 23" lying thereabove may have a height of about 1 to 2 cm.

The grain size of the layers 27 and 25 as well as their heights are selected so that the gas permeablility of both layers is approximately identical. According to FIG. 3, an intermediate sintering layer 32 consisting of a normal sintering mixture such as the layer 25 is situated between the lowest layer 23 and the layer 27 carrying the agglomerates with the secondary substance. The height of the layer 32 can amount to 1 to 2 cm.

The layer 32 essentially differs from the layer 25 in that either no fuel component or only a slight amount of fuel component is present. This can, for example, amount to 1 to 2 wt. % of the sintering mixture. This measure serves to reduce the thermal load of the layer 27 in which, due to the excess of fuel, the danger of formation of a smelting phase exists. In addition thereto, the layer 27 carrying the agglomerates can be composed of a mixture of agglomerates containing fuel and agglomerates which contain no fuel, whereby the share of the latter could amount to approximately 30 wt. %. The layer 27 thus exhibits a specific proportion of special agglomerates which, although they correspond to the remaining agglomerates forming the layer 27 in terms of grain size distribution, nonetheless differ therefrom in terms of composition. These composition differences can consist, for example, thereof in that they contain no secondary substances, contain no fuel or only a slight amount of fuel in comparison to the layer 25 consisting of the normal sintering mixture and thus essentially consist of ores, bonding agents and calcium sources.

It should be evident that various modifications can be made to the described embodiments without departing from the scope of the present invention.

We claim as our invention:

1. A method for separating non-ferrous metals from ferruginous secondary substances consisting of iron containing waste materials, which comprises:
   combining a layer of secondary substances in agglomerated form with at least one layer of a sinterable mixture,
   volatilizing off the non-ferrous metals, recovering the volatilized metals in the form of a solid dust,
   separating the recovered dust into at least a coarse fraction and a fine fraction each having different non-ferrous metal contents,
   combining the coarse fraction with said sinterable mixture,
   sintering the resulting combination, and returning said fine fraction to provide part of said secondary substances.

2. A method according to claim 1 which includes the step of adding a cold bonding agent to the mixture containing the secondary substance which is to be agglomerated.

3. A method according to claim 1 in which a fast hardening cement is added to the secondary substances to be agglomerated in an amount of from 5 to 15 wt. % of the total mixture consisting of secondary substances, fuels, calcium sources, and reflux dusts.

4. A method according to claim 3 in which the fast hardening cement is added in an amount of from 5 to 8 wt. %.

5. A method according to claim 1 in which hydrated lime is added to the secondary substances to be agglomerated in an amount of from 5 to 20 wt. % of the mixture consisting of secondary substances, fuels, ores, and reflux dusts.

6. A method according to claim 5 in which said hydrated lime is added in an amount of 8 to 15 wt. %.

7. A method according to claim 2 in which the mixture containing the secondary substance agglomerated by means of said cold bonding agent is stored for a period of time ranging from 12 to 48 hours.

8. A method according to claim 1 in which the agglomerated mixture containing the secondary substances has a basicity ratio $CaO/SiO_2$ of at least 1.2.

9. A method according to claim 1 in which:
   the composition of the agglomerate containing secondary substances is such that the zinc content is at least 0.5 wt. %, and the lead content is not in excess of 0.5 wt. %.

10. A method according to claim 1 in which a chloride of calcium, magnesium, iron, or an alkali metal is added to the secondary substances in an amount at least sufficient stoichiometrically to chlorinate the zinc and lead oxides present.

11. A method according to claim 1 in which the lowest layer being sintered has a coarser grain size than the layers disposed above.

12. A method according to claim 11 in which:
   the lowest layer is subdivided into a layer whose grain size essentially corresponds to that of the layer lying immediately thereabove and a layer disposed above the former whose grain size is smaller.

13. A method according to claim 11 in which there is an intermediate sintering layer above the lowest layer, the intermediate sintering layer consisting of a normal sintering mixture and being covered by a layer containing agglomerates having the secondary substances, and a layer consisting of a normal sintering mixture thereabove.

14. A method according to claim 13, in which:
   the intermediate sintering layer has an amount of fuel substantially below the amount contained in the layer consisting of the normal sintering mixture.

* * * * *